(No Model.)

S. H. BRACKETT.
Magnetic Support for Scale Beams.

No. 238,841. Patented March 15, 1881.

WITNESSES:
Chas. M. Higgins
Jno. E. Gavin

INVENTOR:
Solomon H. Brackett
by S. W. Allerton
atty.

UNITED STATES PATENT OFFICE.

SOLOMON H. BRACKETT, OF ST. JOHNSBURY, VERMONT, ASSIGNOR TO E. & T. FAIRBANKS & CO., OF SAME PLACE.

MAGNETIC SUPPORT FOR SCALE-BEAMS.

SPECIFICATION forming part of Letters Patent No. 238,841, dated March 15, 1881.

Application filed January 5, 1881. (No model.)

*To all whom it may concern:*

Be it known that I, SOLOMON H. BRACKETT, of St. Johnsbury, Caledonia county, Vermont, have invented certain new and useful Improvements in Scales, of which the following is a specification.

My invention relates to beam or even-balance scales, or other scales depending on pivoted levers, and it lies in an improved means of supporting, pivoting, or suspending the beam, whereby the action of gravity thereon is neutralized and the pivotal motions of the beam produced without, or nearly without, friction.

To this end the main feature of my invention consists in the combination, with the pivotal beam or lever, of a magnet arranged to attract the central or pivotal part of the beam, and suspend or partly suspend the same against the action of gravity.

My invention also embodies details of construction, as hereinafter fully set forth.

Figure 1:
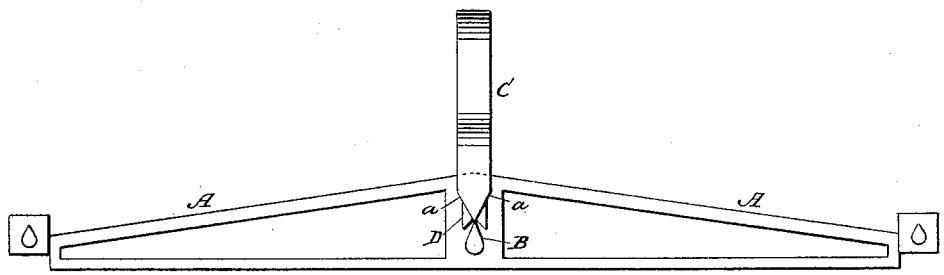
Figure 2:
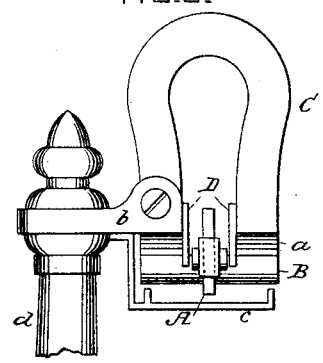
Figure 3:
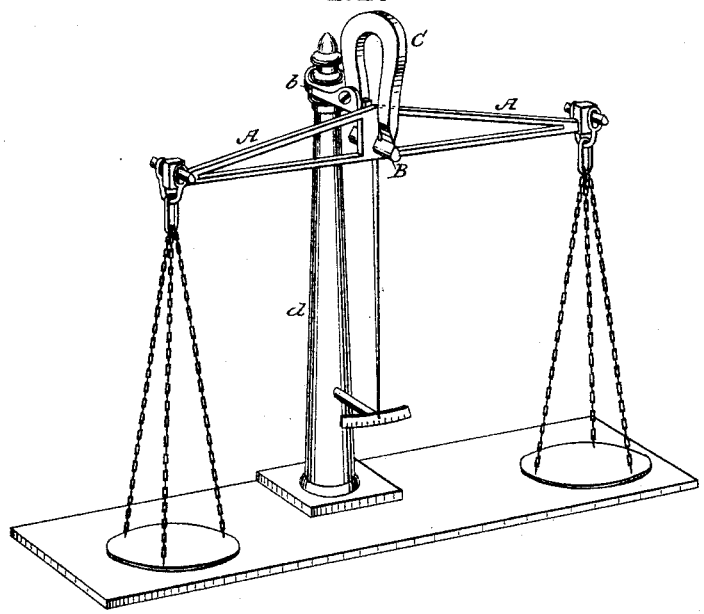

Figure 1 of the annexed drawings represents the beam of an ordinary even-balance scale suspended by means of a magnet attracting the pivot thereof. Fig. 2 gives an enlarged fragmentary view transversely of the beam, showing the side of the magnet and pivot. Fig. 3 gives a perspective view of a complete even-balance scale constructed according to my invention.

In the drawings, A indicates the scale-beam, which is of about the usual form, and has end pivots of the usual construction.

B indicates the central pivot of the beam, whose edge is turned upward, instead of downward, as heretofore; and C indicates a horseshoe-magnet, either permanent or electro, whose poles straddle the beam and approach the pivot B, which latter acts, in fact, as the armature of the magnet. The magnet thus attracts the pivot and holds the beam in suspension against the action of gravity. Consequently the pivot rests on no bearing by the force of gravity, and its tendency is upward instead of downward. The friction of the pivot is thus greatly reduced, if not practically annihilated; and it will be further observed that the arrangement is such that the usual ratio of the friction to the load is in this scales reversed, for whereas in the ordinary scales the friction of the pivot increases as the load on the beam increases, in my improved scale the friction decreases when the load increases, for the weight on the beam counteracts the attraction of the magnet, and hence reduces the adhesion between the pivot and its magnetic seat. The poles of the magnet are preferably beveled equally on each side, or nearly to a knife-edge, similar to the edge of the pivot, so that the attractive force may be uniformly exerted on the pivot and directly in line with the center of the magnet and of the pivot. The poles of the magnet are made of only just sufficient width in the line of the pivot to furnish an even and true bearing for the edge of the pivot.

In Figs. 1 and 2, D indicates two pieces of brass or other non-magnetic material fastened over the magnet-poles, and diverging from the apex or edge of the poles on the under side in the form of an inverted V, the angle of whose sides is greater than that of the pivot. These divergent pieces serve as a guide to keep the pivot on the center or apex of the magnet-poles, and at the same time allow the free pivotal motion of the beam as far as it is ever required to swing.

The magnet C may be held to the pillar $d$ of the scales by the arm $b$ or by any other suitable means.

Below the pivot is fixed a support or guard, $c$, to receive the beam in case it should ever become detached from the magnet by any jar, shock, or excessive weight.

I do not limit myself to the precise constructions described, as these may be modified without departing from the principle of my invention; and it may also be observed that this principle of employing a magnet to attract and suspend the beam at the pivotal portion or fulcrum may be applied to the lever or beam of any weighing-scale—such as to those in which the arms are of unequal length, and in which a sliding poise is used, as well as to even-balance or other scales.

What I claim is—

1. A weighing-scale constructed with a magnet arranged to attract the pivotal part of the beam or lever of the scale and support the beam against the action of gravity, substantially as herein set forth.

2. A weighing-scale constructed with a beam or lever having a central or pivotal part formed of magnetic metal, in combination with a magnet arranged to attract said pivotal part and suspend the beam, substantially as and for the purpose set forth.

3. The combination, with a pivoted scale-beam, of a magnet having its poles arranged to attract and suspend the beam, and reduced to knife-edges to meet with the edges of the pivot, substantially as herein shown and described.

4. The divergent guides D, in combination with the scale-beam and a suspending-magnet, C, substantially as and for the purpose herein set forth.

SOLOMON H. BRACKETT.

Witnesses:
FRANKLIN FAIRBANKS,
WM. P. FAIRBANKS.